2,603,447

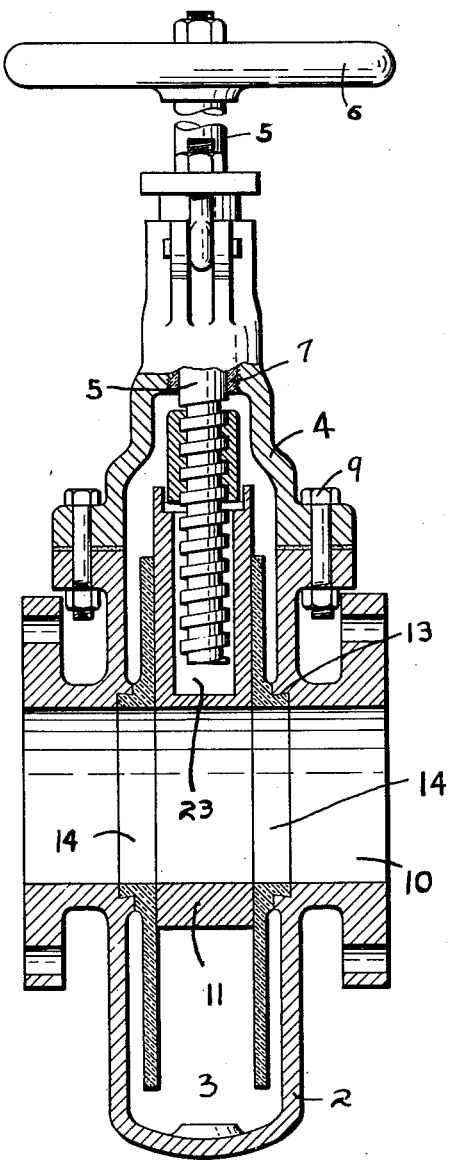
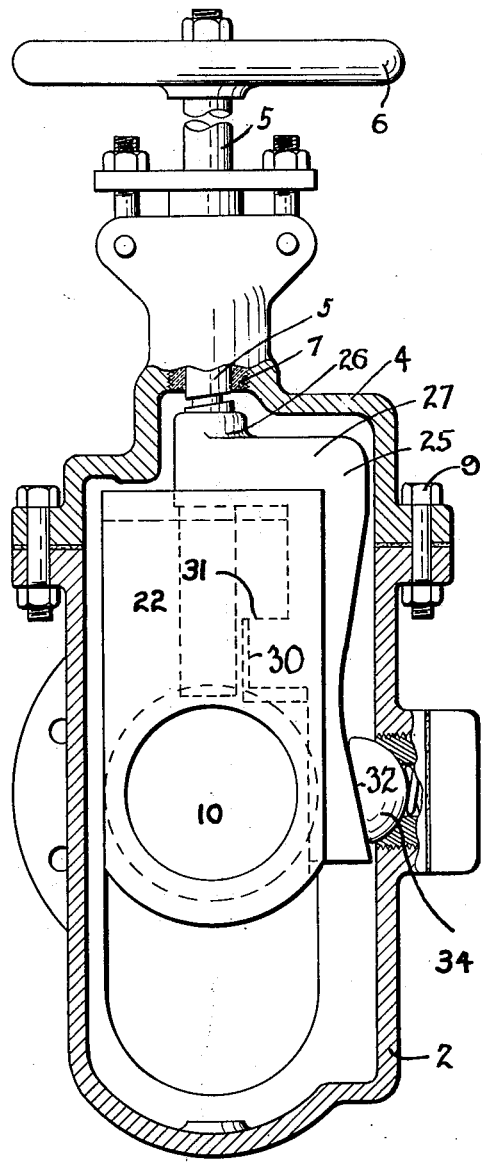
Fig 1
Fig 2
T. A. OLSON
INVENTOR.
BY Lester B. Clark
+ Ray L. Smith
ATTORNEYS

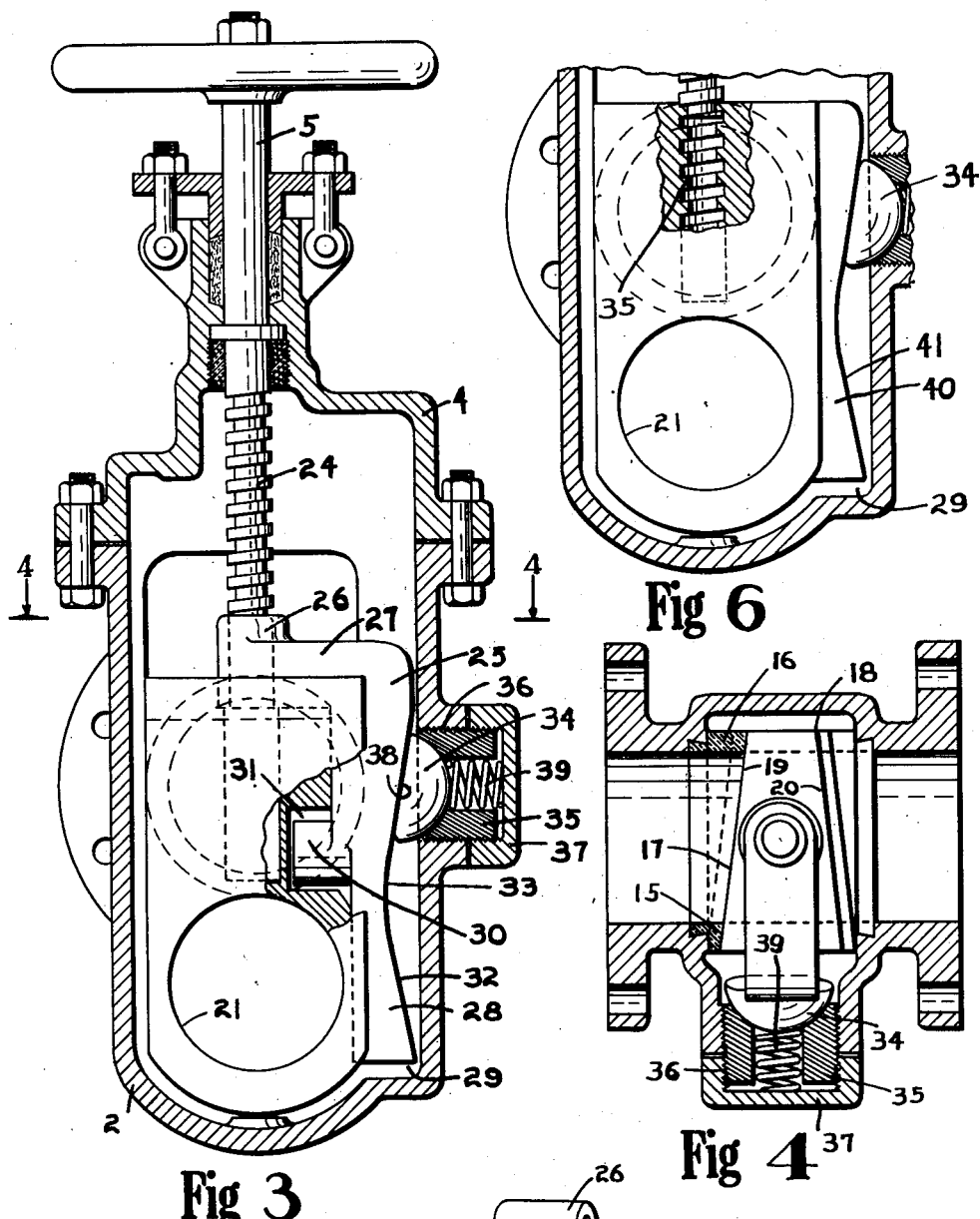
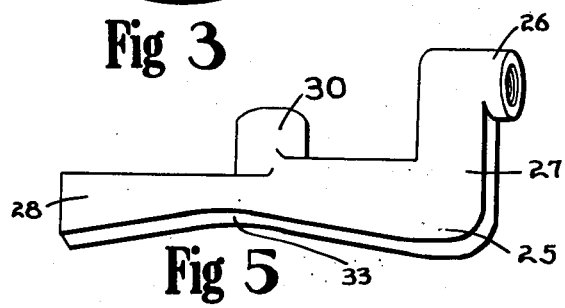
July 15, 1952  T. A. OLSON  2,603,447
VALVE
Filed April 13, 1946  2 SHEETS—SHEET 2
T.A. OLSON
INVENTOR.
BY Lester B. Clark
+ Ray L. Smith
ATTORNEYS Patented July 15, 1952

UNITED STATES PATENT OFFICE 2,603,447

VALVE

Thomas A. Olson, Houston, Tex.

Application April 13, 1946, Serial No. 662,013

2 Claims. (Cl. 251—68)

The invention relates to a gate valve which is particularly arranged to lock the gate in closed position by moving the gate transversely of the flow passage.

In the operation of gate valves, it is imperative that the gate member form a complete seal in closed position by being wedged or closely fitted against the seat. Such sealing action has heretofore been obtained by gate members which are vertically wedge shaped and by gate members which are split so as to be wedged apart but the present invention comprises a gate member which is wedge shaped transversely of the flow passage and a mechanism provided for moving the gate transversely into wedging position after it has been moved vertically to close the flow passage.

It is therefore one of the objects of the invention to form a gate member which is wedge shaped in transverse section in combination with a mechanism to move the gate laterally as it moves into closed position.

Another object of the invention is to provide a gate member with transverse wedge shaped gate seats and gate member so that the gate may move vertically to open or closed position and be moved transversely to sealing and unsealing position.

Still another object of the invention is to provide a gate member wherein the gate is moved vertically and then wedged by lateral movement at the end of the vertical movement to lock the gate in either open or closed position.

Still another object of the invention is to provide a yoke for gate members which will be wedged laterally as the gate moves to either open or closed position.

Still another object of the invention is to provide a mechanism for applying an eccentric pull or push to move a gate member laterally in sealing and unsealing the gate member.

Another object of the invention is to provide a lost motion arrangement for a follower yoke in order to move a gate member transversely to accomplish sealing action thereof.

Another object of the invention is to provide a transversely wedge shaped gate member which is in constant engagement with the seat but which can be wedged laterally in the full open or full closed position.

Other and further objects of the invention will be readily apparent when the following description is considered in connection with the accompanying drawings, wherein:

Fig. 1 is a vertical sectional view taken longitudinally of the valve.

Fig. 2 is a vertical sectional view taken transversely of the valve housing and showing the gate member in elevation and open position.

Fig. 3 is a transverse sectional view through the gate housing showing the gate member in elevation and in closed position.

Fig. 4 is a section taken on the line 4—4 of Fig. 3 showing a top view looking down on the gate to illustrate the wedge shape thereof.

Fig. 5 is a perspective view of the follower yoke.

Fig. 6 is a sectional view similar to Fig. 3 with the gate member broken away to illustrate the connection for effecting vertical movement of the gate.

In Fig. 1 the valve housing 2 is hollow to provide the valve chamber 3. The upper end of this housing is closed with a bonnet 4 which rotatably supports a non-rising valve stem 5 turned by a wheel 6. A suitable packing 7 enclosing a stem 5 is provided to prevent leakage while the bolts 9 affix the bonnet to the housing. The housing has the flow passage 10 therethrough which crosses the valve chamber.

In order to provide a seat and sealing area for the gate member 11, the housing is recessed at 13 to receive the seat plates 14, one of which is provided on each side of the gate chamber at the flow passage.

These seats 14 are of peculiar shape as best seen in Fig. 4 in that one edge of such seat as 15 is rather thin in transverse section while the opposite edge is considerably thickened at 16 to provide a beveled or tapered face 17 as seen in transverse section in Fig. 4.

With this arrangement, a tapered or wedge shaped opening 18 is provided to receive the transversely wedge shaped gate 11. The gate in turn has the inclined or beveled faces 19 and 20 on opposite sides thereof to engage the respective faces 17 of the seat members.

The gate has the opening 21 therein which may be raised to the position of Fig. 2 into alignment with the flow passage 10 or it may be moved into the position of Fig. 3 so that the blank space 22 of the gate intersects the flow passage and closes the same.

As seen in Fig. 1, the gate is provided with a recess 23 which receives the lower end of the threaded portion 24 of the stem 5.

In order to obtain the desired sealing action of the gate member in both open and closed position so as to prevent leakage out of the flow passage, a follower yoke 25 is best seen in Figs. 3 and 5 and this yoke is arranged to have the collar 26 thereof threadedly attached to the portion 24 of the stem 5. This follower yoke extends radially at 27 and longitudinally alongside of the gate at 28 so that it lies in the enlarged recess 29 which is part of the gate chamber. This follower yoke has a stud 30 projecting from the inside surface thereof and which stud is positioned in an opening 31 in the side of the gate member. Particular attention is directed to the fact that the opening 31 is somewhat larger than the stud 30 so that there may be considerable lost motion between the movement of the yoke and the movement of the gate. The collar 26 and the stud 30 provide for a push-pull movement on the gate.

The outer face 32 of the follower yoke is in the form of an inclined or beveled face which is beveled outwardly from the center point 33 so as to be engaged by a cam 34. This cam is supported upon a hollow seat 35 threaded into the opening 36 in the side of the valve housing. This hollow seat is enclosed with a cap 37 and the cam face 38 is urged toward the beveled faces 32 by a coil spring 39. It seems obvious that by removing the cap 37, the seat 35 may be adjusted as desired and a different strength of spring may be applied. Adjustment of the cap 37 may also be used to adjust the pressure upon the spring.

In actual operation when the valve is in open position as seen in Fig. 2, turning of the stem will cause the follower yoke to start its initial movement downwardly.

This initial movement moves the upper edge of the stud 30 away from the upper edge of the opening 31 so that the stud moves downwardly in the recess. This downward movement does not cause the gate member 11 to move but it does move the cam face 32 relative to the cam 34. This slight vertical movement of course releases the yoke from the locked position and permits it to move out of the wedge between the faces 19 and 20 of the seat. In other words, the gate is loosened or unlocked from its wedged position. If the stud 30 engages the lower portion or bottom of the opening 31, it will tend to knock the valve loose if it remains in wedged position. This rap or push on the valve is of course at the outer edge of the wedged area and tends to apply an eccentric pressure tending to pry the valve out of the wedge seat. As the downward movement continues, the gate will be moved downwardly to the position of Fig. 3 and as the upper inclined surface 32 of the follower yoke moves against the cam 34, the gate and the yoke will again be wedged transversely in the closed position of Fig. 3. It seems obvious that the yoke may have sufficient tilting action due to its bell crank shaft so that the threads in the collar 26 will not bind upon the stem 5. When the gate is again to be opened, the yoke only will move upwardly until the stud 30 engages the opening 31. This initial movement will release the wedging action and thereafter continued rotation of the stem 5 will lift the gate to open position.

Fig. 6 shows a slightly modified form wherein a laterally extending flange 40 has the double beveled surface 41 thereon to engage with the cam 34 the same as the follower yoke 25. In Fig. 6, however, this cam surface is formed rigidly with the valve and the opening or recess 23 is reduced to provide a threaded area 35 which receives the threaded portion 24 of the stem. In this manner the gate will negotiate a combination downward and lateral movement as it approaches the full open or the full closed position.

Broadly the invention contemplates an arrangement whereby the gate valve member may be readily moved vertically to open and close the valve but wherein it is moved transversely to effect sealing and locking of the valve in either of such positions.

What is claimed is:

1. A gate valve including a housing, a gate chamber therein, a transversely tapered and longitudinally movable valve member, a stem to open and close said gate, by longitudinal movement, and means including a yoke engaging said gate and actuated by said stem to wedge said gate laterally of its longitudinal movement in open or closed position, a beveled face on said yoke, a cam in said housing on which said yoke beveled face will ride to move said gate laterally and laterally wedge said valve member in said housing, said yoke a threaded connection of said yoke to said stem, and lost motion engaging parts between said yoke and gate whereby said gate yoke moves first to take up said lost motion and continued movement in the same direction will thereafter move said gate.

2. In a gate valve a vertically movable laterally wedgable gate, a housing, a gate chamber across the flow passage, a threaded stem to move said gate, wedge seats tapered transversely of the path of movement of said gate, and cooperating means carried by said gate including a yoke threaded on said stem, a cam in said housing a lateral beveled portion on said yoke engaging said cam to shift said gate laterally of its longitudinal movement to wedge in said seats, and a lost motion connection between said gate and yoke including interengaging parts so that said stem first moves said yoke and said lost motion connection thereupon moves said gate when said yoke executes vertical movement due to said stem and lateral movement due to said bevel and cam.

THOMAS A. OLSON.

REFERENCES CITED

The following references are of record in the file of this patent:

UNITED STATES PATENTS

| Number | Name | Date |
|---|---|---|
| 1,280,451 | Hagen | Oct. 1, 1918 |
| 1,686,057 | Williston | Oct. 2, 1928 |
| 1,826,941 | La Mont | Oct. 13, 1931 |
| 1,942,232 | Alviset | Jan. 2, 1934 |
| 2,282,553 | Banowetz | May 12, 1942 |
| 2,287,435 | Koon | June 23, 1942 |
| 2,306,490 | Noble | Dec. 29, 1942 |
| 2,344,747 | Sperry | Mar. 21, 1944 |